United States Patent

Fujiie

[11] Patent Number: 5,650,991
[45] Date of Patent: Jul. 22, 1997

[54] MAGNETO-OPTICAL DISC HAVING PREFORMATTED INFORMATION TO PREVENT UNAUTHORIZED DATA DUPLICATION

[75] Inventor: Kazuhiko Fujiie, Tokyo, Japan

[73] Assignee: Sony Corporation, Tokyo, Japan

[21] Appl. No.: 869,366

[22] Filed: Apr. 14, 1992

[30] Foreign Application Priority Data

Apr. 19, 1991 [JP] Japan .................................... 3-115429

[51] Int. Cl.$^6$ ................................ G11B 7/24; G11B 15/04
[52] U.S. Cl. ............................... 369/275.4; 369/275.3; 369/48; 369/84; 369/13; 360/60
[58] Field of Search .................... 369/275.4, 275.3, 369/30, 83, 84, 48, 13, 58, 59, 110, 114; 360/60, 27

[56] References Cited

U.S. PATENT DOCUMENTS

| | | | |
|---|---|---|---|
| 4,229,808 | 10/1980 | Hui | 360/48 |
| 4,797,752 | 1/1989 | Giddings | 369/275.3 |
| 5,060,219 | 10/1991 | Lokhoff et al. | 369/48 |
| 5,107,481 | 4/1992 | Miki et al. | 369/59 |
| 5,124,966 | 6/1992 | Roth et al. | 369/47 |
| 5,132,954 | 7/1992 | Kulakowski et al. | 369/58 |
| 5,144,658 | 9/1992 | Takahashi | 360/60 |
| 5,166,921 | 11/1992 | Matsui | 369/275.3 |
| 5,237,547 | 8/1993 | Ohkuma et al. | 369/13 |
| 5,255,261 | 10/1993 | Iida et al. | 369/275.3 |
| 5,345,435 | 9/1994 | Yamasaki | 369/275.3 |
| 5,373,498 | 12/1994 | Tagiri | 369/275.3 |

FOREIGN PATENT DOCUMENTS

| | | |
|---|---|---|
| 61-178732 | 11/1986 | Japan . |
| 2-46963 | 3/1990 | Japan . |
| 2-83881 | 3/1990 | Japan . |

*Primary Examiner*—Georgia Y. Epps
*Assistant Examiner*—Kim-Kwok Chu
*Attorney, Agent, or Firm*—Limbach & Limbach L.L.P.

[57] ABSTRACT

A magneto-optical disc 1 has a TOC area in which the cumulative recordable data volume or the cumulative recordable time is preformatted, and a user TOC area in which the cumulative recorded data volume or the cumulative recorded time is preformatted. When recording audio data, a system controller 17 restricts the volume of recording data or the recording time based on the cumulative recordable data volume, the cumulative recordable time, cumulative recorded data volume, the cumulative recorded time or the data compression factor, while causing an updated cumulative recorded data or an updated cumulative recorded time to be recorded. Restrictions of the recording may be performed based on the cumulative recorded data volume or the cumulative recorded time. A prepaid system may be realized by charging the fee conforming to the cumulative recordable data volume or the cumulative recordable time at the time of sale of the disc.

6 Claims, 7 Drawing Sheets

2---PHOTOMAGNETIC RECORDING AREA
3---PIT RECORDING AREA
4---PIT RECORDING AREA

2 --- PHOTOMAGNETIC RECORDING AREA

3 --- PIT RECORDING AREA

4 --- PIT RECORDING AREA

MAGNETO-OPTICAL DISC HAVING PREFORMATTED INFORMATION TO PREVENT UNAUTHORIZED DATA DUPLICATION

BACKGROUND OF THE INVENTION

1. Field of the Invention

This invention relates to a disc-shaped recording medium and a disc recording apparatus. More particularly, it relates to a disc-shaped recording medium for recording audio data by optical means, and a disc recording apparatus for recording audio data on such disc-shaped recording medium.

2. Description of the Prior Art

Among the disc-shaped recording media, such as optical discs, there are a plurality of types of discs, including a read-only disc, such as a compact disc (CD), a write-once type disc, on which data can be written only once, and a rewritable disc on which data can be re-written, such as a magneto-optical disc.

It may be contemplated that audio data processed by 16-bit straight quantization, with a sampling frequency of 44.1 kHz, be recorded on a user-recordable optical disc, such as the above-mentioned write-once type optical disc or magneto-optical disc, using a CD format, or a format with further data compression (CD-I format).

In these cases, the problem of copyright infringement is presented. That is, if audio signals can be recorded and reproduced as digital signals, dubbing may be effected many times without deterioration of the audio signals. Thus it becomes necessary to restrict recording in some way or other.

To this end, there are known a method of completely inhibiting dubbing of the audio signals as the digital signals, and techniques disclosed in JP Utility Model KOKAI Publication 2-46963 (1990) and JP Patent KOKAI Publication 2-83881 (1990) filed in the name of the present Assignee. Specifically, the former method, referred to hereinafter as a first technique, resides in prerecording or preformatting cumulative recordable time on an optical disc and recording cumulative recorded time up to the current time each time recording is made to restrict the recording when the cumulative recorded time exceeds the cumulative recordable time. The latter method, referred to hereinafter as a second technique, resides in dividing the user-recordable area of the write-once type optical disc into a number of subareas corresponding to the recordable number of tunes so that only one tune may be recorded in each subarea.

However, with the above-mentioned method of inhibiting dubbing of the digital signals, one of the usages of the magneto-optical disc or the like is lost. With the above-mentioned first technique, there is no problem when recording audio data in conformity to the CD-DA format. However, if recording is made in accordance with the CD-I format, that is if the audio data are recorded with data compression, the actual recording time is longer than that when recording is made in accordance with CD-DA format, even although the cumulative recorded time remains the same, so that the problem of partiality is raised. Specifically, the levels shown in Table 1 are prescribed in the CD-I format.

TABLE 1

| LEVEL | SAMPLING FREQUENCY | QUANTIZED NUMBER OF BITS | BAND- WIDTH | REPRODUC- ING TIME STEREO/ MONAURAL |
|---|---|---|---|---|
| A | 37.8 kHz | 8 | 17 kHz | 2/4 |
| B | 37.8 kHz | 4 | 17 kHz | 4/8 |
| C | 18.9 kHz | 4 | 8.5 kHz | 8/16 |

It is seen from Table 1 that, in the level B mode, for example, signals compressed to about ¼ of the audio data of the standard CD-DA format are recorded or reproduced. This means that the recording time or the playback time may be fourfold.

On the other hand, with the above-mentioned second technique, the actually recordable time of music differs with different length of tunes, even although the number of tunes remains the same, so that again the problem of partiality is raised.

OBJECTS AND SUMMARY OF THE INVENTION

In view of the above depicted status of the aft, it is an object of the present invention to provide a disc-shaped recording medium, such as a write-once type optical disc or a magneto-optical disc, in which, when recording audio data, recording may be restricted on the basis of the recorded cumulative data volume.

It is another object of the present invention to provide a disc-shaped recording medium, such as a write-once type optical disc or a magneto-optical disc, in which, when recording audio data with data compression, recording may be restricted on the basis of the actual recorded time, that is the duration of music.

It is yet another object of the present invention to provide a disc recording apparatus for recording audio data on such disc-shaped recording medium.

A disc-shaped recording medium according to a first aspect of the present invention comprises a first area for recording data, a second area in which the volume of the data recordable in said first area is recorded, and a third area in which the cumulative volume of the data recorded in said first area is recorded.

A disc recording apparatus according to a second aspect of the present invention comprises a disc-shaped recording medium including a first area for recording data, a second area in which the volume of the data recordable in said first area is recorded, and a third area in which the cumulative volume of the data recorded in said first area is recorded, data recording means for recording the data in said first area, and cumulative data recording means for recording the cumulative volume of the data recorded by said data recording means in said third area.

A disc recording apparatus according to a third aspect of the present invention comprises a disc-shaped recording medium including a first area for recording data, a second area in which the recordable time in said first area is recorded, and a third area in which the cumulative recorded time in said first area is recorded, data recording means for recording the data with compression in said first area, and cumulative recorded time recording means for calculating the cumulative recorded time based on the data volume recorded by said data recording means and a data compression factor and for recording the calculated cumulative recorded time in said third area.

When recording data in the first area of the disc-shaped recording medium by the disc recording apparatus of the present invention, the cumulative data volume indicating the volume of the data recorded up to the current time in the first area is recorded in the third area. The data volume recordable in the first area and the data volume recorded up to the current time may be known by reproducing the second area and the third area.

Also, when recording the data with data compression in the first area of the disc-shaped recording medium, the cumulative recorded time indicating the recorded time up to the current time based on the recorded data volume and the data compression factor is recorded in the third area. The recordable time in the first area and the recorded time up to the current time may be known on reproducing the second area and the third area.

By prerecording the recordable data volume or the recordable recording time in this manner on the disc-shaped recording medium, such as the magneto-optical disc, and by updating and recording the recorded cumulative data volume or the cumulative recorded time each time recording is made, restrictions of recording may be made based on these information data. The control of the above-mentioned restrictions on the recording may be coped with by changing the soft, ware of the disc recording apparatus without raising hardware costs.

A so-called prepaid system may also be easily realized by charging the fee conforming to the preformatted recordable data volume or recording time when the disc is sold to a customer.

The above and other objects of the present invention will become apparent from reading the following description in conjunction with the accompanying drawings and the new matter pointed out in the claims.

DETAILED DESCRIPTION OF THE PREFERRED EMBODIMENTS

Figure 1:
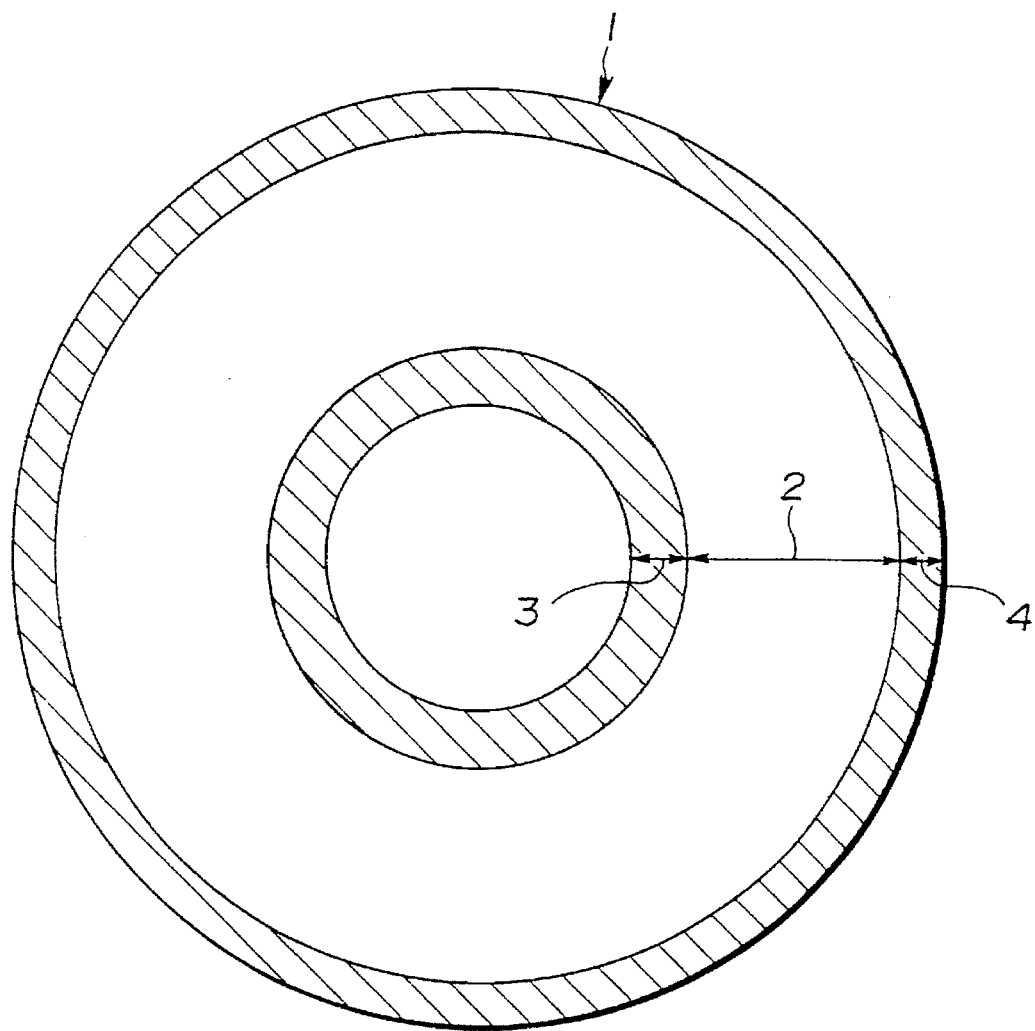
FIG. 1 is a plan view showing a magneto-optical disc according to the present invention.
Figure 2:
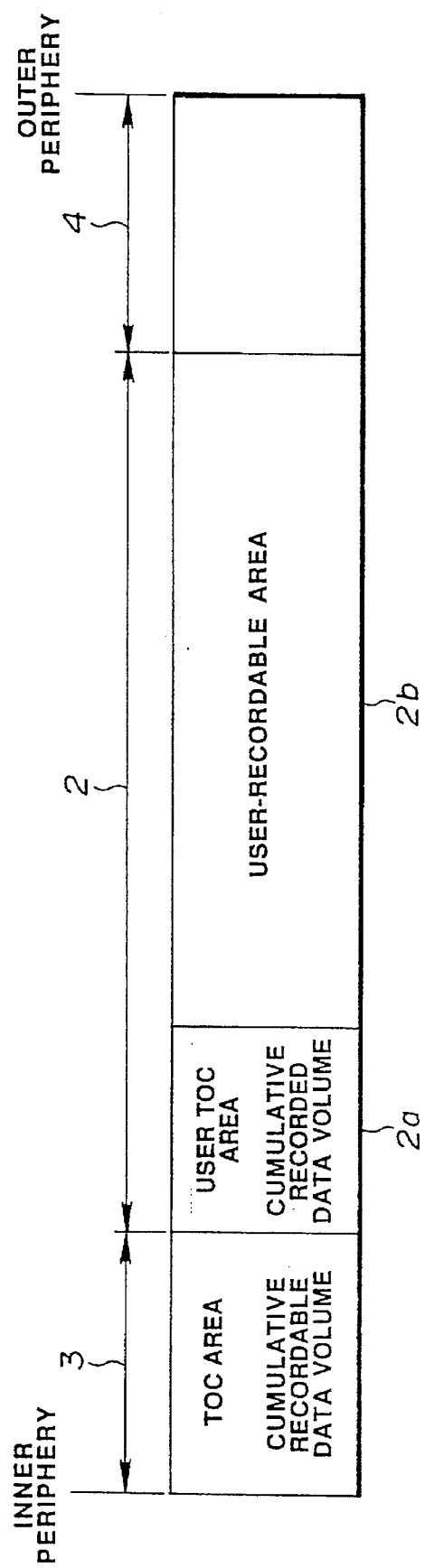
FIG. 2 is a diagrammatic view showing the recording manner of the magneto-optical disc.
Figure 3:
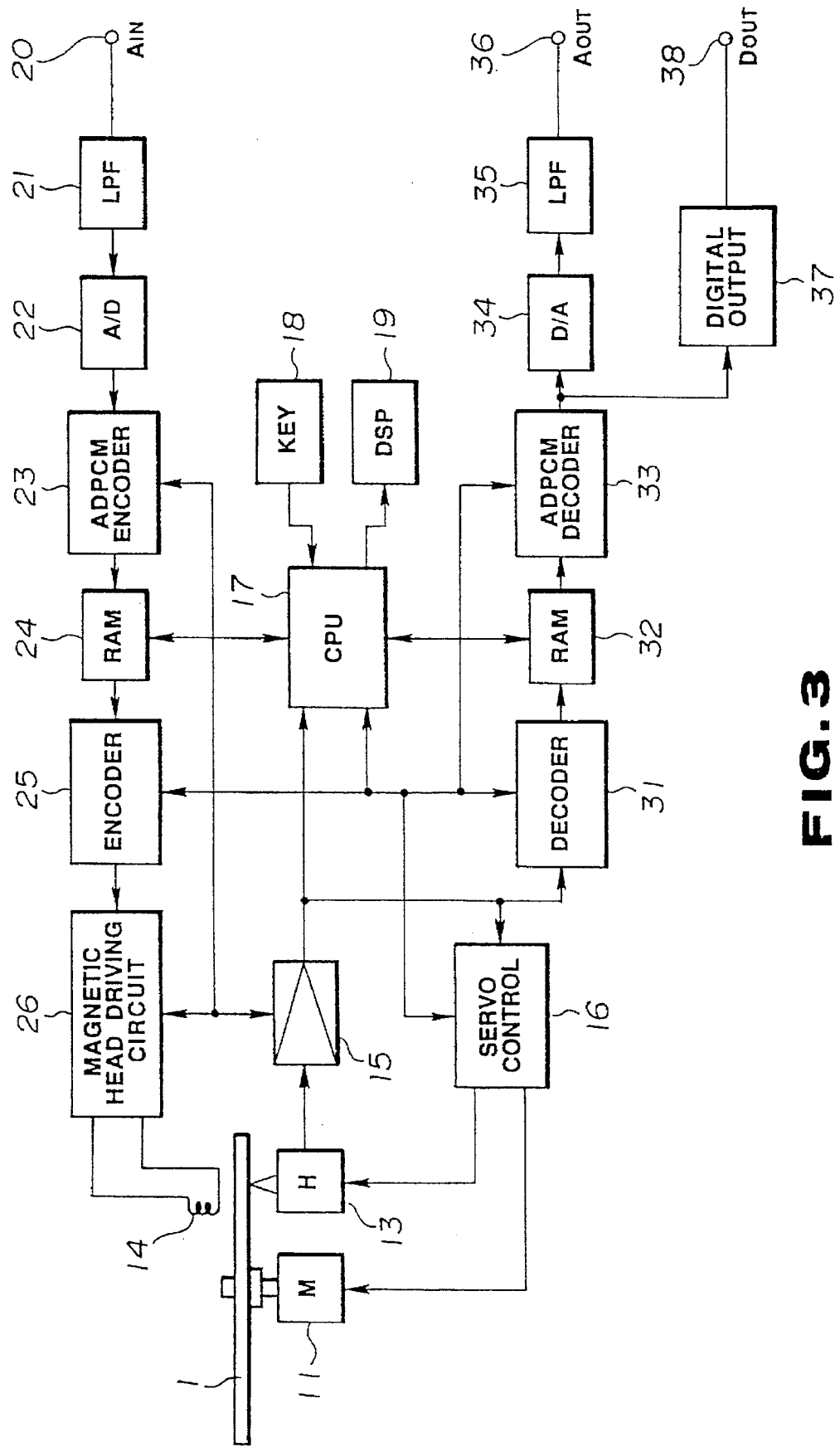
FIG. 3 is a block circuit, diagram showing the circuit arrangement of a disc recording/reproducing apparatus according to the present invention.

Referring to the drawings, a magneto-optical disc and an optical disc recording/reproducing apparatus according to the present invention will be explained in detail. FIG. 1 is a plan view showing the magneto-optical disc. FIG. 2 is a diagrammatic view showing the recording manner on the; magneto-optical disc and FIG. 3 is a block circuit diagram showing a circuit arrangement of an optical disc recording/ reproducing apparatus.

Referring to FIG. 1, the magneto-optical disc 1 is provided with a photomagnetic recording region 2 for data recording/reproduction by the user, and a pit recording area 3 (lead-in area) and a second pit recording area 4 (lead-out area) which are arranged on inner and outer sides of the area 2, respectively, and in which the information to be described later is prerecorded in the form of pits.

The pit recording area 3 is used as an area for recording table-of-contents data. In this pit recording area, or TOC area 3, the cumulative recordable data volume, indicating the data volume that may be recorded on the magneto-optical disc 1, is prerecorded as pits at the time of disc production, as shown in FIG. 2.

The photomagnetic recording area 2 is divided into a user-inaccessible user TOC area 2a and a user accessible or user recordable or reproducible area 2b, as again shown in FIG. 2. In the user TOC area 2a, the cumulative recorded data volume, indicating the data volume recorded up to the current time, is automatically recorded each time recording is made.

The optical disc recording/reproducing apparatus for recording/reproducing audio data on or from the above-mentioned magneto-optical disc 1, is hereinafter explained.

In the optical disc recording/reproducing apparatus, shown in FIG. 3, the magneto-optical disc 1 is rotationally driven by a spindle motor 11. Data may be recorded along a recording track of the magneto-optical disc 1 by radiating a laser beam to the disc by e.g. an optical head 13 and simultaneously applying a magnetic field modulated in accordance with recording data, while the recorded data may be photomagnetically reproduced by tracing the magneto-optical disc 1 with the laser beam from the optical head 13. Such data recording and reproduction are performed on the basis of cluster addresses and sensor addresses prerecorded or preformatted on the magneto-optical disc 1, as will be explained subsequently.

The optical head 13, although not shown in detail, is made up of a laser light source, such as a laser diode, a set of optical components, such as a collimator lens, an object lens, a beam splitter or a cylindrical lens, and a photodetector arranged in a predetermined manner. For data recording on the magneto-optical disc 1, the above-mentioned magnetic head 14 is driven by a head driving circuit 26 of a recording system as later described, whilst the laser beam is radiated by the optical head 13 to the target track of the magneto-optical disc 1, to which the magnetic field modulated in accordance with the recording data is applied by the magnetic head 14, for recording data by thermomagnetic recording. The optical head 13 also detects the reflected laser light of the laser light radiated on the target track to detect the focusing error and the tracking error by an astigmatic method and a push-pull method, respectively, while detecting the difference in the angle of polarization of the reflected light from the target track (Kerr rotation angle) for generating playback signals for reproducing data from the magneto-optical disc 1. The optical head 13 also reproduces the cumulative recordable data volume preformatted in the TOC area 3 of the magneto-optical disc 1 and the cumulative recorded data volume recorded in the user TOC area 2a, while reproducing the cluster addresses and the sector addresses preformatted as pits in e.g. the leading end of each sector together with synchronizing signals or the like.

An output of the optical head 13 is supplied to an RF circuit 15, which extracts focusing error signals or tracking error signals from the output of the optical head 13 for supplying the extracted signals to a servo controlling circuit 16. The RF circuit 15 also converts the playback signals into binary signals for supplying the converted binary signals to a decoder 31 of the reproducing system as will be described subsequently. The RF circuit 15 transmits the reproduced cumulative recordable data volume, cumulative recorded data volume, cluster addresses and the sector addresses to a system controller 17 as will be described subsequently.

The above-mentioned servo controlling circuit 16 is made up of a focusing servo controlling circuit, a tracking servo controlling circuit and a thread servo controlling circuit. The focussing servo controlling circuit focusing controls the optical system of the optical head 13 so that the above-mentioned focusing error signals are reduced to zero, while the tracking servo controlling circuit controls the tracking of the optical head 13 so that the tracking error signals will be reduced to zero. The above-mentioned spindle servo controlling circuit controls the spindle motor 11 for rotationally driving the magneto-optical disc 1 at a predetermined rotational velocity, such as a constant linear velocity. The thread servo controlling circuit causes the optical head 13 and the magnetic head 14 to be moved to a target track position of the magneto-optical disc 1 designated by system controller 17. The above-mentioned servo controlling circuit 16 transmits the information concerning the operating states of various parts controlled thereby to the system controller 17.

A key input operating section 18 and a display section 19 are connected to the system controller 17. The system controller controls the recording system and the playback system at an operating mode designated by the operating input information from the key input operating section 18.

Specifically, the system controller 17 superintends the recording position and the playback position on the recording track traced by the optical head 13 and the magnetic head 14 based on the cluster addresses and the sector addresses reproduced from the magneto-optical disc 1. The system controller 17 also effects recording restriction based on the cumulative recordable data volume and the cumulative recorded data volume supplied from the RF circuit 15, while recording an updated cumulative data volume in the user TOC area 2a on the magneto-optical disc 1 whenever data recording is made. The system controller 17 also displays on the display section 1a the remaining recordable data volume and the effect that recording can no longer be made. The system controller is displays the play time, that is the reproducing time, on the display section 19 based on the data compression ratio under the data compression mode and the above-mentioned cluster addresses etc.

For displaying the reproducing time, the cluster addresses and the sector addresses reproduced from the recording track of the magneto-optical disc are multiplied by a reciprocal of the data compression factor under the data compression mode, which is equal to 4 for the data compression factor of ¼, to find the actual time information which is displayed on the display section 19. Meanwhile, it is also possible to display the current position by actual recording time during recording by reading the preformatted cluster addresses and sector addresses and multiplying the read out cluster and sector addresses by the reciprocal of the data compression factor.

The recording system of the disc recording/reproducing apparatus includes an A/D converter 22 supplied with analog audio signals $A_{IN}$ from an input terminal 20 via a lowpass filter 21.

The audio signals $A_{IN}$ are quantized by the A/D converter 22. The audio data from the A/D converter 22 are supplied to an adaptive delta PCM (ADPCM) encoder 23. The audio signals $A_{IN}$ are processed by the ADPCM encoder 23 with a data compressing operation associated with one of a variety of operating modes in the CD-I format of Table 1 explained in connection with the prior art techniques. The operating mode is designated by system controller 17. For example, in the level B mode shown in Table 1, compressed data having the sampling frequency of 37.8 kHz and the number of bits per sample of 4 (ADPCM audio data) are supplied from the ADPCM encoder 23 to a memory 24. That is, the data transfer rate with the B level stereo mode is diminished to one-fourth of the data transfer rate of the standard CD-DA format of 75 sectors/second, or 18.75 sectors/second.

Meanwhile, in the embodiment of FIG. 1, it is assumed that the sampling frequency of the A/D converter 22 is fixed at e.g. the sampling frequency according to the above-mentioned standard CD-DA format of 44.1 kHz, and that, in the ADPCM encoder 23, sampling rate conversion in accordance with the above-mentioned compression mode, such as that from 44.1 kHz to 37.8 kHz for level B, is first made, followed by date compression from 16 bits to 4 bits. As an alternative, the sampling frequency of the A/D converter 22 itself may be switchingly controlled depending on the particular compression mode, in which case the cut-off frequency of the low-pass filter 21 is also switched depending on the thus switchingly controlled sampling frequency of the A/D converter 22. That is, the sampling frequency of the A/D converter 22 and the cut-off frequency of the lowpass filter 21 may be controlled simultaneously depending on the particular compression mode.

The above-mentioned memory 24 has data writing and readout controlled by the system controller 17 and is used as a buffer memory for transiently storing the ADPCM audio data from the ADPCM encoder 23 for recording thereof on the disc as the occasion may demand. That is, in the level B stereo mode, the ADPCM audio data from the ADPCM encoder 23 has its data transfer rate reduced to one-fourth of the data transfer rate for the standard CD-DA format of 75 sectors/second, or to 18.75 sectors/second. It is this ADPCM audio data that is continuously written in the memory 24. Although it suffices to record one of four sectors with this ADPCM audio data, such recording at an interval of four sectors is virtually impossible, so that sector-continuous recording is performed in a manner which will be explained subsequently. This recording is performed in a burst-like fashion at the same data transfer rate as that of the standard CD-DA format (75 sectors/second), with a cluster composed of a predetermined number of sectors, such as 32 plus several sectors, as a recording unit, and with the interposition of a non-recording period. That is, in the memory 24, the B-level stereo mode ADPCM audio data, continuously written at the low transfer rate of 18.75 (75/4) sectors/second conforming to the above-mentioned data compression mode is read out as recording data in a burst-like manner at the transfer rate of 75 sectors/second. Although the overall data transfer rate for the read-out and recorded data, taking account of the non-recording period, is the above-mentioned low rate of 18.75 sectors/second, the instantaneous data transfer rate within the burst-like recording time is the above-mentioned standard rate of 75 sectors/second. Therefore, if the rotational velocity of the disc is equal to the velocity for the standard CD-DA format (constant linear velocity), recording is effected at the same recording density and the same recording pattern as those of the CD-DA format.

Figure 5:
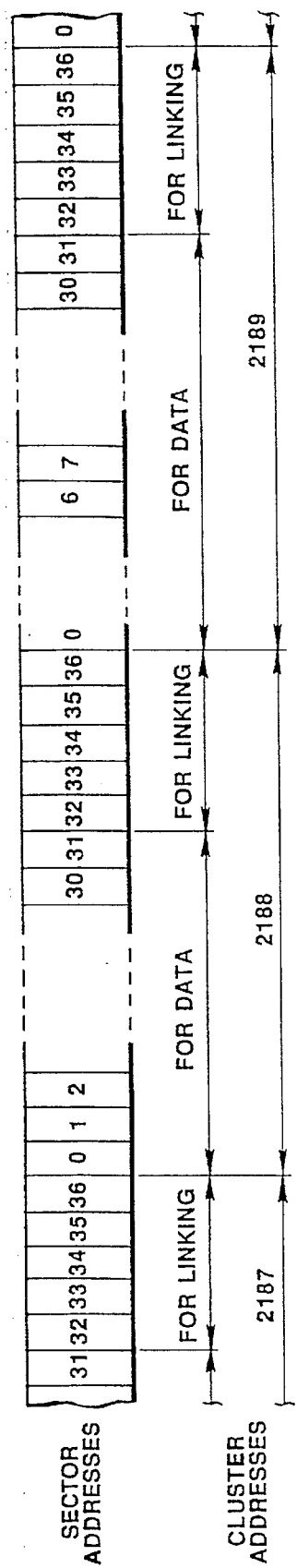
FIG. 5 show the relation between the cluster and the cluster and sector addresses.

The ADPCM audio data, read out in a burst-like manner from memory 24 at the above-mentioned transfer rate of 75 sectors/second, are supplied to an encoder 25. It is noted that, in a data string supplied from memory 24 to the encoder 25, a recording unit continuously recorded by one recording operation is composed of a cluster formed by a plurality of, e.g. 32 sectors, and several cluster-linking sectors arrayed before and after the cluster. These cluster-linking sectors are each set so as to be longer than an interleaving length in the encoder 25 so that data interleaving in a given cluster does not affect the data in the neighboring clusters. Details of such cluster-by-cluster recording will be explained subsequently by referring to FIG. 5.

The recording data supplied from memory 24 to the encoder 25 in a burst-like manner is processed by the encoder 25 with encoding for error correction, such as appending parity data or interleaving, and with EFM encoding. The encoded recording data from encoder 25 is transmitted to the above-mentioned magnetic head driving circuit 26.

The above-mentioned magnetic head, 14 is connected to the magnetic head driving circuit 26 driving the magnetic head 14 for applying a magnetic field modulated in accordance with the recording data to the magneto-optical disc 1.

On the other hand, the system controller 17 controls the memory 24 in the above-mentioned manner and, by so doing, controls the recording position of the recording data read out in a burst-like manner from memory 24 in such a manner that these recording data will be continuously recorded on the recording track of the magneto-optical disc 1. Such recording position control is performed by supervising the recording position of the above-mentioned recording data read out in a burst-like manner from memory 24 on the basis of the above-mentioned cluster addresses and sector addresses by the system controller 17 and by supplying a control signal designating the recording position on the recording track on the magneto-optical disc 1 to the servo controlling circuit 16. The system controller 17 also effects a controlling operation of recording an updated cumulative recorded data volume in the user TOC area 2a of the magneto-optical disc 1 at the time of completion of recording of the recording data.

The reproducing system in the disc recording/reproducing apparatus will now be explained.

The reproducing system reproduces the record data continuously recorded by the above-described recording system on the recording track of the disc 1, and is provided with the decoder 31, to which is supplied a playback output, which is generated by the optical head 13 tracing the recording track on the disc 1 with a laser light and is converted into binary format signals by the RF circuit 15.

The decoder 31 is a counterpart of the above-described encoder 25 of the recording system, and processes the playback output, converted into the binary format signals by the RF circuit 15, with the above-mentioned decoding and EFM decoding. The decoder reproduces B level stereo mode ADPCM audio data at a transfer rate of 75 sectors/second, which is faster than the normal transfer rate in the above-mentioned B level stereo mode. The reproduced data, generated by the decoder 31, are supplied to a memory 32.

The memory 32 has its data writing and read-out controlled by system controller 17 so that the playback data supplied from decoder 31 at a transfer rate of 75 sectors/second are written in a burst-like manner at the transfer rate of 75 sectors/second. Also the playback data written in a burst-like manner at the transfer rate of 75 sectors/second in the memory 32 are continuously read out at the ordinary B-level stereo mode transfer rate of 18.75 sectors/second.

The system controller 17 also performs a writing/readout memory control of writing the reproduced data in the memory 32 at the transfer rate of 75 sectors/second, continuously reading out the playback data from the memory 32 at the transfer rate of 18.75 sectors/second.

The system controller 17 performs, besides the above-mentioned writing and read-out control for the memory 32, a playback position control in such a manner that the playback data written by the above-mentioned memory control in the memory 32 are reproduced continuously from the recording track of the magneto-optical disc 1. The playback position control is performed by supervising a playback position on the disc 1 of the above-mentioned playback data read out in a burst-like manner from memory 22 by system controller 17, and by supplying a control signal designating the playback position on the recording track of the disc 1 to the servo controlling circuit 16.

The B-level stereo mode ADPCM audio data, produced as playback data read out continuously from memory 32 at a transfer rate of 18.75 sectors/second, are supplied to the ADPCM decoder 33.

The ADPCM decoder 33 is a counterpart of the above-mentioned ADPCM encoder 23 of the recording system. The ADPCM decoder 33 has its operating mode designated by system controller 17. With the present apparatus, the B-level stereo mode ADPCM audio data are expanded by a factor of 4 for reproducing the CD-DA mode digital audio data. The reproduced digital data are transmitted by the ADPCM decoder 33 to a D/A converter 34.

The D/A converter 34 causes the digital audio data supplied from the ADPCM decoder 33 into an analog audio signal $A_{OUT}$ which is supplied via a low-pass filter 35 at an output terminal 36.

The reproducing system of the apparatus is provided with a digital outputting function so that the digital audio data at the output of the ADPCM decoder 33 is outputted at a data output terminal 38 via a digital output encoder 37 as a digital audio signal $D_{OUT}$.

The magneto-optical disc 1 employed in the above-described apparatus preferably has a recording space of longer than 60 minutes and up to 74 minutes for stereo audio signals. With the data compression rate of ¼ as in the above-mentioned B level mode, a recording capacity of about 130M bytes is necessary. For a portable or pocketable size of apparatus, it is preferred to use a disc outside diameter of 8 cm or less. In addition, a track pitch of 1.6 μm and a linear velocity of 1.2 to 1.4 m/second, similar to those of a compact disc, are preferred. For satisfying these conditions, the disc outside diameter may be 64 mm, the outside diameter of a disc recording region may be 61 mm, the inside diameter of the data recording region may be 32 mm, the inside diameter of a lead-it region may be 30 mm, and a center hole diameter may be 10 mm. By having this disc accommodated in a disc caddy (cartridge) of 70×74 mm in size and presented to the market in this state, it becomes possible to record and reproduce the disc by a pocket-size recording/reproducing apparatus. The inside and outside diameters of the disc recording region for enabling recording and/or reproduction for 72 to 76 minutes with the above-mentioned ¼ data compression mode may be suitably selected within the range of the outside diameter of 60 to 62 mm for the inside diameter of 32 mm and within the range of the outside diameter of 71 to 73 mm for the inside diameter of 50 mm.

The recording/reproducing operation of the above apparatus will be explained in more detail.

Figure 4:
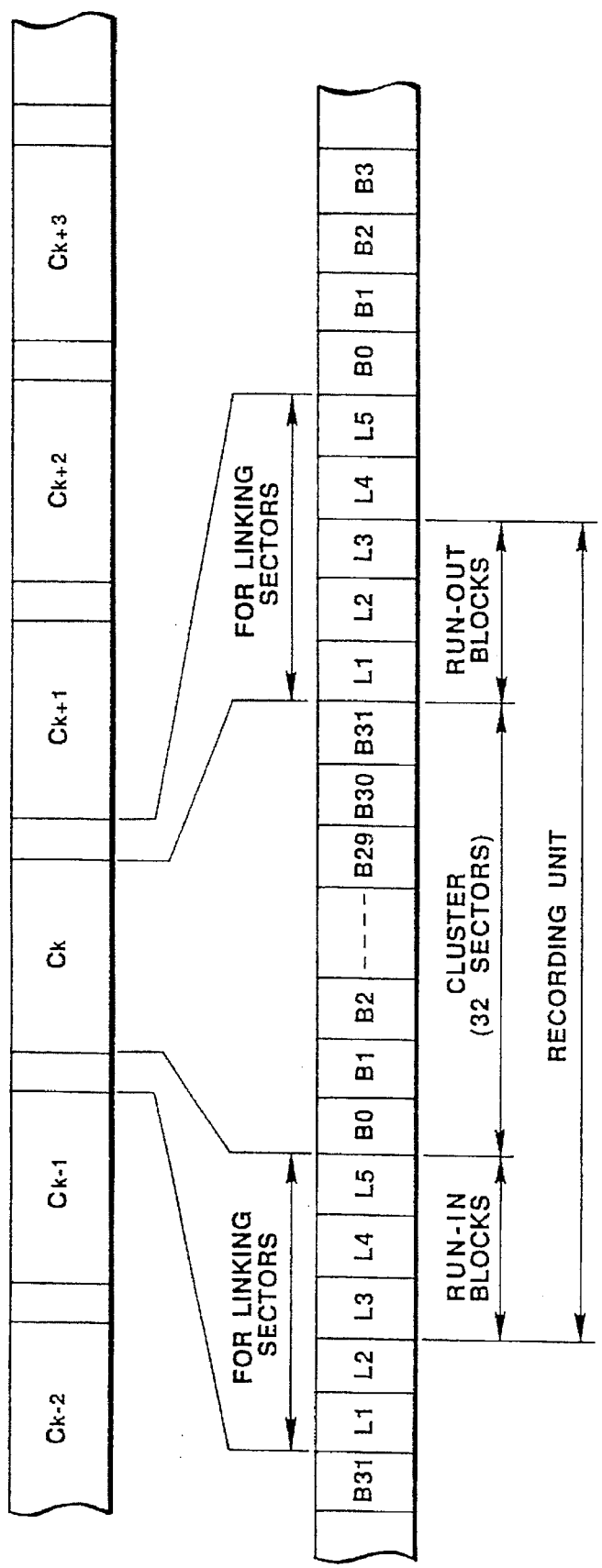
FIG. 4 shows a format of a cluster as a recording unit.

The recording data, that is data read out from memory 14, is arranged into a cluster at an interval of a predetermined number of, for example, 32, sectors or blocks, and several cluster-linking sectors are arrayed between adjoining clusters. In more detail, each cluster C is composed of 32 sectors or blocks B0 to B31, and five linking sectors L1 to L5 are arranged between these clusters C for linking the adjoining clusters, as shown in FIG. 4. For recording a cluster, such as a K'th cluster $C_k$, the 32 sectors B0 to B31 of the cluster $C_k$, and the linking clusters before and after the cluster $C_k$, namely the three sectors L3 to L5 towards the cluster $C_{k-1}$ (run-in blocks) and the three blocks L1 to L3 towards the cluster $C_{k+1}$ (run-out blocks), making a total of 38 sectors, are recorded as one unit. The 38-sector recording data are transmitted from memory 14 to the encoder 15 where data are interleaved and rearranged over a distance of up to 108 frames corresponding to about 1.1 sector. However, even after interleaving, the data within the cluster $C_K$ are safely contained within a range of from the run-in blocks L3 to L5 to the run-out blocks L1 to L3 without affecting the remaining clusters $C_{k-1}$ or $C_{k-133}$. Meanwhile, dummy data, such as 0, are arrayed in the linking sectors L1 to L5 to avoid adverse effects which interleaving might have on the data per se. When recording the next cluster $C_{k+1}$, the three sectors L3 to L5 of the five linking sectors L1 to L5 between the current cluster and the next cluster $C_{k+1}$ are used as run-in blocks, so that the sector L3 is recorded superfluously. However, this causes no inconvenience. The above-mentioned cluster may be composed of 37 sectors, inclusive of the linking sectors.

The above-mentioned recording on the cluster-by-cluster basis is performed on the basis of the cluster addresses and the sector addresses obtained by reproducing pits preformatted at the leading end of each sector. As shown for example in FIG. 5, each cluster is composed of 32 data-recording sectors and 5 linking sectors, totalling 37 sectors. 12-bit addresses are allocated as the cluster-specifying cluster addresses and 6-bit addresses are allocated as sector-specifying sector addresses. These cluster and sector addresses are preformatted as pits and reproduced during recording so as to be used for supervising the recording positions on the recording track. Meanwhile, the cluster addresses and the sector addresses may be preformatted by offsetting so-called grooves radially of the disc.

By such recording on the cluster-by-cluster basis, there is no necessity to take account of interference with adjoining clusters, so that data processing may be simplified significantly. On the other hand, if the record data should be unable to be recorded normally due to malfunctions, such as defocusing, detracking etc. re-recording may be performed on the cluster-by-cluster basis. If the recorded data cannot be reproduced effectively, re-recording may similarly be effected on the cluster-by-cluster basis.

Figure 6:
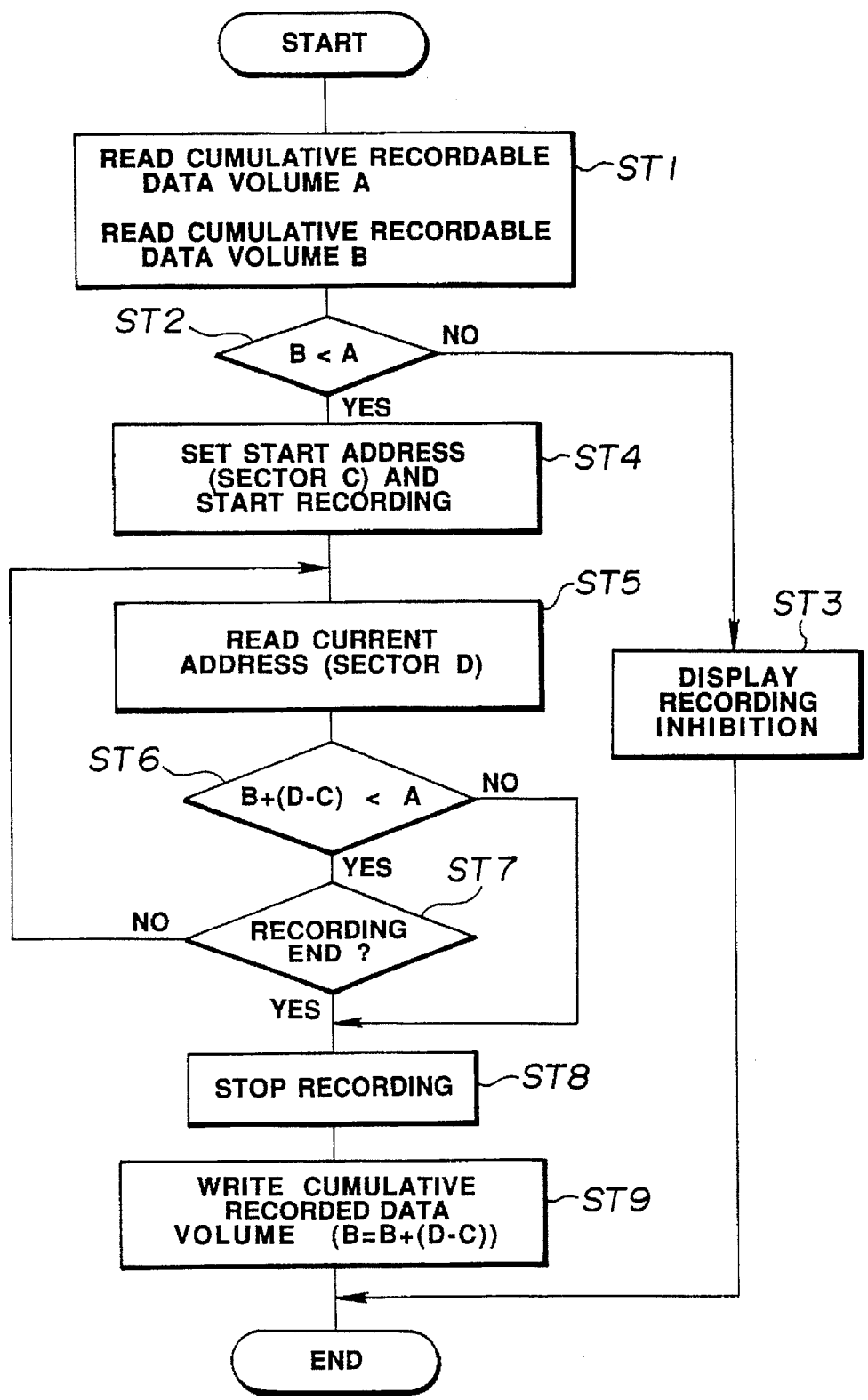
FIG. 6 is a flowchart for illustrating the control of recording restriction in the disc recording/reproducing apparatus.

In the above-mentioned disc recording apparatus, adapted for controlling data based on the cluster and sector addresses, restrictions of recording, such as that based on the recorded data volume, will be explained by referring to a flowchart shown in FIG. 6.

At step ST1, system controller 17 reads a cumulative recordable data volume A, indicating the data volume that may be recorded on the magneto-optical disc 1, from the TOC area 3, while reading a cumulative recorded data volume B, indicating the data volume recorded up to the preceding recording, from the user TOC area 2a, before proceeding to step ST2. Meanwhile, the cumulative recorded data volume B may be found for example in the following manner based on the above-mentioned cluster and sector addresses. If the number of clusters in which data recording has been completed, that is, clusters in all of the sectors of which data has been recorded, is L, the number of the effective sectors in each cluster is M and the number of sectors in a cluster in which data recording is not completed is N, the cumulative recorded data volume B is given by $$B = L \times M + N.$$

The number of the effective sectors M means the number of sectors exclusive of the linking sectors and is equal to 32 in the above example.

At step S2, system controller 17 checks if the cumulative recorded data volume B is less than the cumulative recordable data volume A. If the answer is negative, system controller 17 proceeds to step ST3 and, if the answer is affirmative, system controller 17 proceeds to step ST4.

At step ST3, system control let 17 controls the display section 19 to make a display of recording inhibition because the cumulative recorded data volume B exceeds the cumulative recordable data volume A and hence new audio data can not be recorded. The system controller then terminates the program.

On the other hand, system controller 17 sets a recording start address at step ST4. After finding the number of effective sectors C from the leading end, for example, corresponding to the address, system controller 17 causes the recording to be started, before proceeding to step ST5.

At step ST5, system controller 17 reads the current address up to which audio data has been recorded, and finds the number of effective sectors D from the leading end, for example, corresponding to the address, before proceeding to step ST6.

At step ST6, system controller 17 sums the data volume recorded up to the current time, obtained during the current recording (D−C), to the cumulative recorded data volume up to the preceding recording, to check if the resulting sum does not exceed the cumulative recordable data volume A, that is if (B+(D−C)<A) holds. If the answer is affirmative, system controller 17 proceeds to step ST7 and, if the answer is negative, system controller proceeds to step ST8.

At step ST7, system controller 17 checks if recording has been terminated. If the answer is negative, system controller reverts to step ST5 and, if the answer is affirmative, system controller proceeds to step ST8.

At step ST8, system controller 17 terminates recording to proceed to step ST9. That is, in a loop of the steps ST5 to ST7, system controller 17 checks to see if the cumulative recorded data volume, which is the data volume recorded up to the current time, is not excess of the cumulative recordable data volume, by way of controlling the recording of the audio data. If the cumulative recorded data volume exceeds the cumulative recordable data volume, system control let inhibits recording of the audio data.

At step ST9, system controller 17 finds an updated cumulative recorded data volume B (=B+(D−C)) to record the updated cumulative recorded data volume B in the user TOC area 2a before terminating the program.

Figure 7:
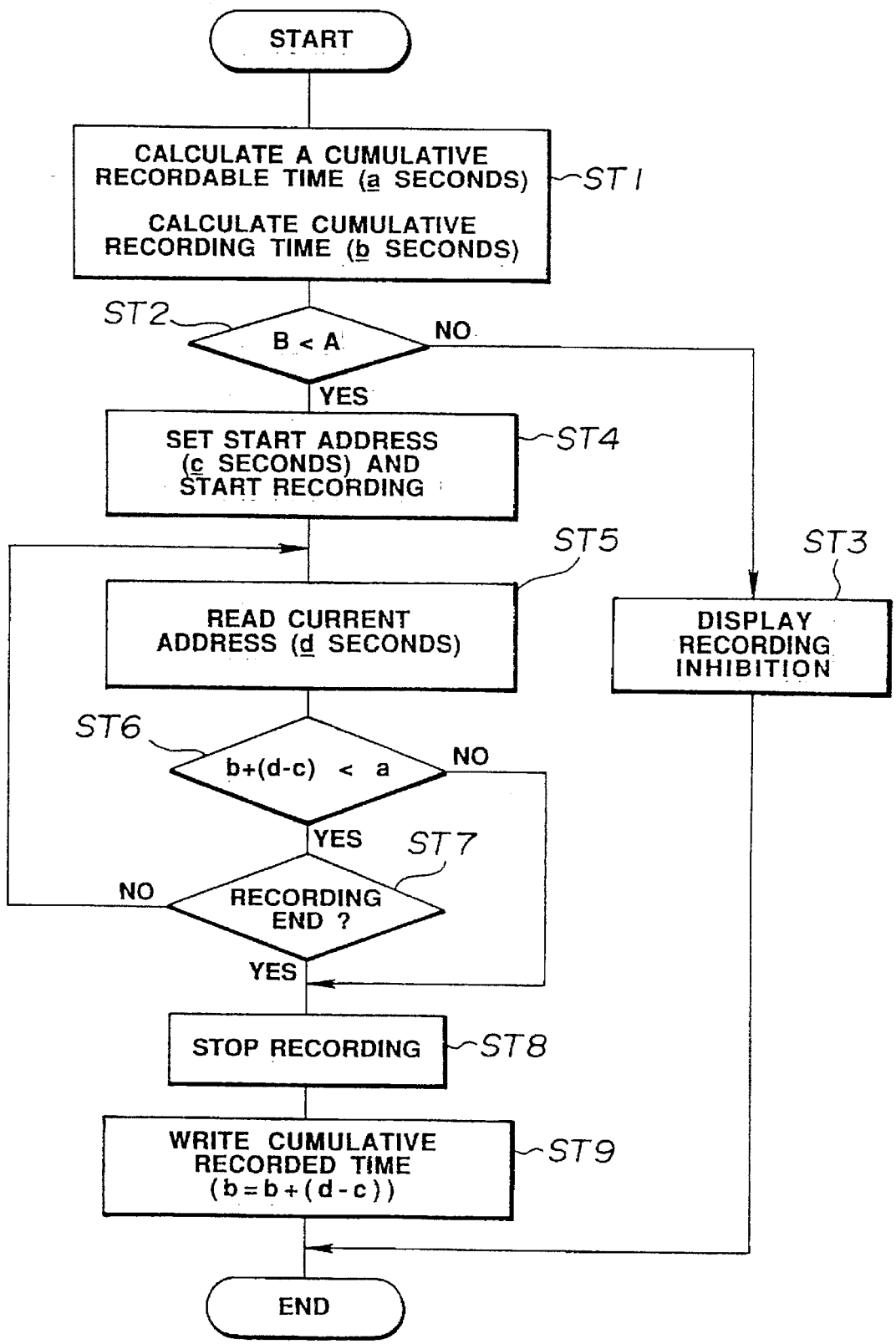
FIG. 7 is a flowchart for illustrating the control of recording restriction in the disc recording/reproducing apparatus.

Another example of restricting recording based on the actual recording time is explained by referring to the flowchart of FIG. 7.

At step ST1, system controller 17 reads a cumulative recordable data time a, indicating the cumulative recordable time a on the magneto-optical disc 1, from the TOC area 3, while reading a cumulative recorded time b, indicating the cumulative recorded time up to the preceding recording, from the user TOC area 2a, before proceeding to step ST2. Meanwhile, the cumulative recorded time may be found in the following manner based on the cluster and sector addresses. If, for example, the number of clusters in which data recording is completed is L, the number of effective sectors in each cluster is M, the number of sectors in which data recording is completed in a cluster in which data recording is not completed is N, the data compression factor is E and the recording time; per sector when data compression is not made is T seconds, the cumulative recorded time b is given by $$b=(L\times M+N)\times E\times T$$

At step ST2, system controller 17 checks to see if the cumulative recorded time b is less than the cumulative recordable time a. If the answer is negative, system controller 17 proceeds to step ST3 and, if the answer is affirmative, system controller proceeds to step ST4.

At step ST3, system controller 17 causes the display section 19 to display the effect that, since the cumulative recorded time b exceeds the cumulative recordable, time a, recording is inhibited, before terminating the program.

On the other hand, system controller 17 sets a recording start address and finds the recording time c from the leading end, for example, corresponding to the address, at step ST4, before proceeding to step ST5.

At step ST5, system controller 17 reads the current address in which the audio data is recorded to find the recording time d from the leading end, for example, corresponding to the address, before proceeding to step ST6.

At step ST6, system controller 17 sums the recorded time up to the current time in the current recording (d−c) to the cumulative recording time b up to the preceding time to check if the sum is not in excess of the cumulative recordable time a, that if (b+(d−c)<a) holds. If the answer is affirmative, system controller 17 proceeds s to step ST7 and, if the answer is negative, system controller 17 proceeds to step ST8.

At step ST7, system controller 17 checks if recording is terminated. If the answer is negative, the system controller reverts to step ST5 and, if the answer is affirmative, system controller proceeds to step ST8.

At step ST8, system controller 17 stops recording to proceed to step ST9. That is, if audio data are recorded with data compression, system controller 17 calculates the recording time based on the data volume and the data compression factor in the loop of from step ST5 to step ST7 to check to see if the cumulative recorded time, that is time recorded up to the current time, is not in excess of the cumulative recordable time, by way of controlling the recording of the audio data. If the cumulative recorded time exceeds the cumulative recordable time, system controller 17 inhibits recording of the audio data.

At step ST9, system controller 17 finds an updated cumulative recorded time b (=b+(d−c)) to record the cumulative recorded time b in the user TOC area 2a before terminating the program.

It will be seen from above that, by previously recording the cumulative recordable data volume or the cumulative recordable time in the TOC area 3 of the magneto-optical disc 1, updating and newly recording the cumulative recorded data volume or the cumulative recorded time each time recording is made, and by controlling data recording based on these information data, restrictions of recording may be made based on the recorded cumulative recorded data volume or the cumulative recorded time. When audio data is recorded with data compression, restrictions of recording may be performed on the basis of actual recording time or duration of the music tune. The above-mentioned restrictions of the recording may be coded with by changing the software of the system controller 17 without raising hardware costs.

Also, by charging the fee conforming to the prerecorded cumulative recordable time or the cumulative recordable time at the time the disc is sold to a customer, a prepaid system may be realized easily.

The present invention is not limited to the above-described embodiments, but may comprise various modifications. For example, although recording of the B level stereo mode ADPCM audio data is explained in the foregoing, recording of the ADPCM data in the other modes of the CD-I format may be realized in a similar manner.

What is claimed is:

1. A disc-shaped recording medium comprising a recording surface which is divided into a first area in which user data is recorded, a second area in which data corresponding to the volume of the data recordable in the first area is recorded, and a third area in which data corresponding to the cumulative volume of the data recorded in the first area is recorded.

2. A disc-shaped recording medium as claimed in claim 1 wherein the disc-shaped recording medium is a magneto-optical disc and the recording surface includes a photomagnetic recording area divided into the first area and the third area, and wherein the second area includes a pit recording area in which data corresponding to the volume of the data recorded in the first area is prerecorded as pits.

3. A disc-shaped recording medium according to claim 2 wherein the user data recorded on the disc-shaped recording medium is digital data which is magneto-optically recorded.

4. A disc-shaped recording medium according to claim 1, wherein the second area is on an inner periphery of the disc-shaped recording medium, the third area is arranged radially next in succession outwardly of the second area, and the first area is arranged radially next in succession outwardly of the third area.

5. A disc recording apparatus for use with a disc-shaped recording medium which includes a recording surface divided into a first area in which user data is recorded, a second area in which data corresponding to the volume of the data recordable in the first area is recorded, and a third area in which the data corresponding to the cumulative volume of the data recorded in the first area is recorded, the disc recording apparatus comprising:

data recording means for recording user data in the first area, and cumulative data recording means for recording data corresponding to the cumulative volume of the data recorded by the data recording means in the third area.

6. A disc recording apparatus for use with a disc-shaped recording medium including a recording surface divided into a first area in which user data is recorded, a second area in which data corresponding to the recordable time in the first area is recorded, and a third area in which data corresponding to the cumulative recorded time in the first area is recorded, the disc recording apparatus comprising:

data recording means for recording user data with compression in the first area, and cumulative recorded time recording means for calculating a cumulative recorded time based on the data volume recorded by the data recording means and a data compression factor for recording data corresponding to the calculated cumulative recorded time in the third area.

* * * * *